US012780583B2

(12) United States Patent
Nakano

(10) Patent No.: US 12,780,583 B2

(45) Date of Patent: Nov. 3, 2026

(54) SHEET STACKING APPARATUS AND IMAGE FORMING APPARATUS

(71) Applicant: CANON KABUSHIKI KAISHA, Tokyo (JP)

(72) Inventor: Tomoki Nakano, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/901,319

(22) Filed: Sep. 30, 2024

(65) Prior Publication Data

US 2025/0115450 A1 Apr. 10, 2025

(30) Foreign Application Priority Data

Oct. 4, 2023 (JP) ................................ 2023-172586

(51) Int. Cl.

| | |
|---|---|
| ***B65H 31/22*** | (2006.01) |
| ***B41J 13/10*** | (2006.01) |
| ***B62B 3/04*** | (2006.01) |
| ***B65H 43/00*** | (2006.01) |

(52) U.S. Cl.

CPC ........... *B65H 31/22* (2013.01); *B41J 13/106* (2013.01); *B62B 3/04* (2013.01); *B65H 43/00* (2013.01); *B65H 2301/42124* (2013.01); *B65H 2301/4431* (2013.01); *B65H 2402/42* (2013.01); *B65H 2557/30* (2013.01); *B65H 2801/06* (2013.01); *B65H 2801/15* (2013.01)

(58) Field of Classification Search

CPC .................... B65H 31/22; B65H 31/18; B65H 2301/42252; B65H 2301/42256; B65H 2402/441; B65H 2402/42; B65H 2601/11; B65H 2601/321; B65H 2405/312; G03G 21/1623; G03G 21/1638; G03G 21/1633; G03G 21/1628; B62B 3/04

See application file for complete search history.

(56) References Cited

FOREIGN PATENT DOCUMENTS

| | | | |
|---|---|---|---|
| JP | 2007197112 A | * | 8/2007 |
| JP | 2009215015 A | | 9/2009 |

* cited by examiner

*Primary Examiner* — Luis A Gonzalez

(74) *Attorney, Agent, or Firm* — ROSSI, KIMMS & McDOWELL LLP

(57) ABSTRACT

A sheet stacking apparatus includes a conveyance path through which a sheet is to be conveyed, a guide which forms a part of the conveyance path and is openable and closeable with respect to the conveyance path, a lock member configured to lock the guide to maintain the guide in a closed state in which the guide is closed with respect to the conveyance path, and a trolley. In a case in which the trolley is placed at a predetermined position in the sheet stacking apparatus, a locked state in which the lock member locks the guide is prohibited from being unlocked so that the guide is maintained in the closed state. In a case in which the trolley is not placed at the predetermined position, the locked state is allowed to become an unlocked state in which the lock member does not lock the guide.

21 Claims, 7 Drawing Sheets

SHEET STACKING APPARATUS AND IMAGE FORMING APPARATUS

BACKGROUND OF THE DISCLOSURE

Field of the Disclosure

The present disclosure relates to a sheet stacking apparatus including a trolley, and an image forming apparatus.

Description of the Related Art

Hitherto, there has been known a sheet stacking apparatus (stacker) that aligns and stacks sheets on which images are formed by an image forming apparatus. Such a sheet stacking apparatuses may include a stack tray on which sheets are stacked and a trolley with an operation portion (handle) used by a user in carrying the stack tray on which the sheets are stacked, to the outside of the sheet stacking apparatus (Japanese Patent Application Laid-Open No. 2009-215015). Further, the sheet stacking apparatus includes an openable and closable guide that is opened and closed in order to remove a jammed sheet that has stopped in the course of conveyance within the sheet stacking apparatus.

However, in the related-art sheet stacking apparatus, in which a jam clearing process can be performed while sheets are stacked on the trolley, a user may accidentally touch a bundle of sheets aligned and stacked on the trolley during the jam clearing process, to cause displacement or collapse in the bundle of sheets. In a case in which the trolley is placed at a position far from the openable and closable guide for the jam clearing process so that a user cannot touch a bundle of sheets on the trolley during the jam clearing process, the sheet stacking apparatus is increased in size.

SUMMARY OF THE DISCLOSURE

According to an aspect of the present disclosure, a sheet stacking apparatus includes: a conveyance path through which a sheet is to be conveyed; a guide which forms a part of the conveyance path and is openable and closeable with respect to the conveyance path; a lock member configured to lock the guide to maintain the guide in a closed state in which the guide is closed with respect to the conveyance path; and a trolley, wherein, in a case in which the trolley is placed at a predetermined position in the sheet stacking apparatus, a locked state in which the lock member locks the guide is prohibited from being unlocked so that the guide is maintained in the closed state, and wherein, in a case in which the trolley is not placed at the predetermined position, the locked state is allowed to become an unlocked state in which the lock member does not lock the guide.

Further features of the present disclosure will become apparent from the following description of exemplary embodiments with reference to the attached drawings.

DESCRIPTION OF THE EMBODIMENTS

Hereinafter, embodiments of the present disclosure are described in detail with reference to the accompanying drawings. However, the following embodiments do not limit the disclosure defined in claims. Further, not all of combinations of features described in the embodiment are essentially required for solving the problem of the present disclosure.

First Embodiment (Image Forming Apparatus)

Figure 1:
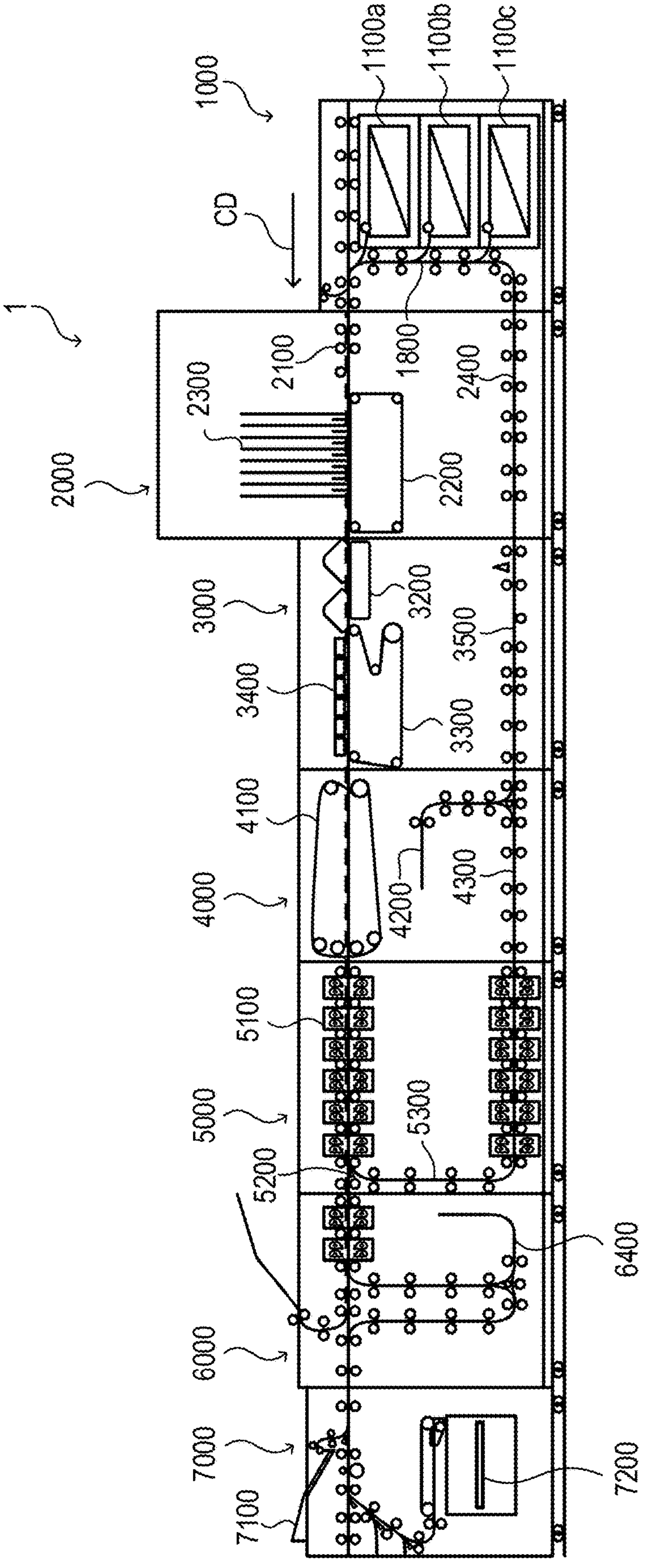
FIG. 1 is a sectional view of an image forming apparatus.

Now, an image forming apparatus 1 according to a first embodiment is described with reference to FIG. 1. FIG. 1 is a sectional view of the image forming apparatus 1. The image forming apparatus 1 is a recording apparatus of an ink-jet type (ink jet recording apparatus) that forms an ink image on a sheet serving as a recording medium. However, the image forming apparatus 1 is not limited thereto, and may be, for example, an image forming apparatus of an electrophotographic method that forms a toner image on a sheet. The image forming apparatus 1 is an ink jet recording apparatus of a sheet-fed type that uses two components corresponding to a reaction liquid and ink to form an ink image (image) on a sheet. The image forming apparatus 1 includes a feeding module 1000, a print module 2000, a drying module 3000, a fixing module 4000, a cooling module 5000, a reversing module 6000, and a discharge stacking module 7000. A flat sheet (cut sheet) fed from the feeding module 1000 is conveyed along a conveyance path, is processed in the modules described above, and is discharged to the discharge stacking module 7000.

(Feeding Module)

The feeding module 1000 includes three storages 1100*a*, 1100*b*, and 1100*c*, each storing a plurality of sheets. The storages 1100*a*, 1100*b*, and 1100*c* are configured to be pulled out toward a front side of the feeding module 1000. The sheets stored in the storages 1100*a*, 1100*b*, and 1100*c* are fed one by one by separation belts (not shown) and conveyance rollers (not shown) arranged corresponding to the respective storages and are conveyed to the print module 2000. The number of storages is not limited to three, and may be one, two, four or more.

(Print Module)

The print module 2000 includes a before-image-formation registration correcting portion 2100, a print belt unit 2200, and a recording portion (image forming portion) 2300. The sheet conveyed from the feeding module 1000 are corrected in its skew and its position by the before-image-formation registration correcting portion 2100, and thereafter, the sheet is conveyed to the print belt unit 2200. The recording portion 2300 is arranged at a position opposed to the print belt unit 2200 across the conveyance path. The recording portion 2300 is an image forming portion that performs a recording process (printing) using recording heads from above on the conveyed sheet in a conveyance direction CD to form an image on the sheet. The sheet is attracted and conveyed by the print belt unit 2200, and thereby a clearance between the sheet and the recording heads is ensured.

A plurality of recording heads are arranged in the conveyance direction CD. In the embodiment, the recording head includes a total of five line-type recording heads corresponding to four colors, that is, yellow (Y), magenta (M), cyan (C), and black (Bk), and a reaction liquid. The number of colors is not limited to four, and the number of recording heads is not limited to five. As an ink jet system, for example, a system using heating elements, a system using piezo elements, a system using electrostatic elements, and an MEMS (Micro Electro Mechanical System) elements can be employed. An ink of each of the colors is supplied from an ink tank (not shown) to the recording head via an ink tube (not shown). The sheet printed by the recording portion 2300 is conveyed by the print belt unit 2200 to an inline scanner (not shown) arranged on a downstream side of the recording portion 2300 in the conveyance direction CD. The inline scanner (not shown) detects misregistration or a color density of the image that has been formed on the sheet and can output a result of the detection that is used to correct the image.

(Drying Module)

The drying module 3000 includes a decoupling portion 3200, a drying belt unit 3300, and a hot air blowing portion 3400. The drying module 3000 is a unit that reduces a liquid in the inks that have been applied onto the sheet by the recording portion 2300 to increase fixability between the inks and the sheet. The sheet on which the ink image has been formed by the recording portion 2300 of the print module 2000 is conveyed to the decoupling portion 3200 arranged inside the drying module 3000. The decoupling portion 3200 applies a wind pressure from above so that the sheet is gently held on the belt and conveys the sheet with a frictional force of the belt. In this manner, the sheet, on which the ink image is formed, is prevented from being shifted on the print belt unit 2200. Hot air is blown from the hot air blowing portion 3400 arranged above the drying belt unit 3300 onto the sheet that has been conveyed from the decoupling portion 3200 while the sheet is being attracted and conveyed by the drying belt unit 3300. In this manner, an ink-applied surface of the sheet is dried.

(Fixing Module)

The fixing module 4000 includes a fixing-belt unit 4100. The fixing-belt unit 4100 allows the ink solvent to sufficiently permeate the sheet by causing the sheet conveyed from the drying module 3000 to pass between an upper belt unit that is heated and a lower belt unit.

(Cooling Module)

The cooling module 5000 includes a plurality of cooling portions 5100 that cool the sheet having a high temperature, which has been conveyed from the fixing module 4000. Each of the cooling portions 5100 cools the sheet by taking an outside air into a cooling box with a fan to increase a pressure inside the cooling box and blowing a wind jetted out from nozzles formed in a conveyance guide onto the sheet. The cooling portions 5100 are arranged on both sides of the conveyance path to cool the sheet from both sides.

Further, the cooling module 5000 includes a conveyance-path switching portion 5200. The conveyance-path switching portion 5200 switches the conveyance path for the sheet depending on whether the sheet is conveyed to the reversing module 6000 or to a duplex-printing conveyance path 1800 that is used at the time of duplex printing. At the time of duplex printing, the sheet is conveyed by the conveyance-path switching portion 5200 to a conveyance path 5300 below the cooling module 5000. The sheet is conveyed from the conveyance path 5300 to the duplex-printing conveyance path 1800 inside the feeding module 1000 via a conveyance path 4300 inside the fixing module 4000, a conveyance path 3500 inside the drying module 3000, and a conveyance path 2400 inside the print module 2000. The sheet is conveyed from the duplex-printing conveyance path 1800 to the before-image-formation registration correcting portion 2100, the print belt unit 2200, and the recording portion 2300 of the print module 2000 again, and an ink image is formed by the recording portion 2300. The conveyance path 4300 of the fixing module 4000 includes a first reversing portion 4200 that reverses the sheet.

(Reversing Module)

The reversing module 6000 includes a second reversing portion 6400. The second reversing portion 6400 reverses the front side and the back side of the sheet being conveyed. Thus, the reversing module 6000 can switch the orientations of the front side and the back side of the sheet to be discharged.

(Discharge Stacking Module)

The discharge stacking module 7000 includes a top tray 7100 and a stacking tray 7200. The discharge stacking module 7000 aligns and stacks the sheets conveyed from the reversing module 6000 on the top tray 7100 or the stacking tray 7200.

(Description of Basic Operation of Discharge Stacking Module)

Figure 2:
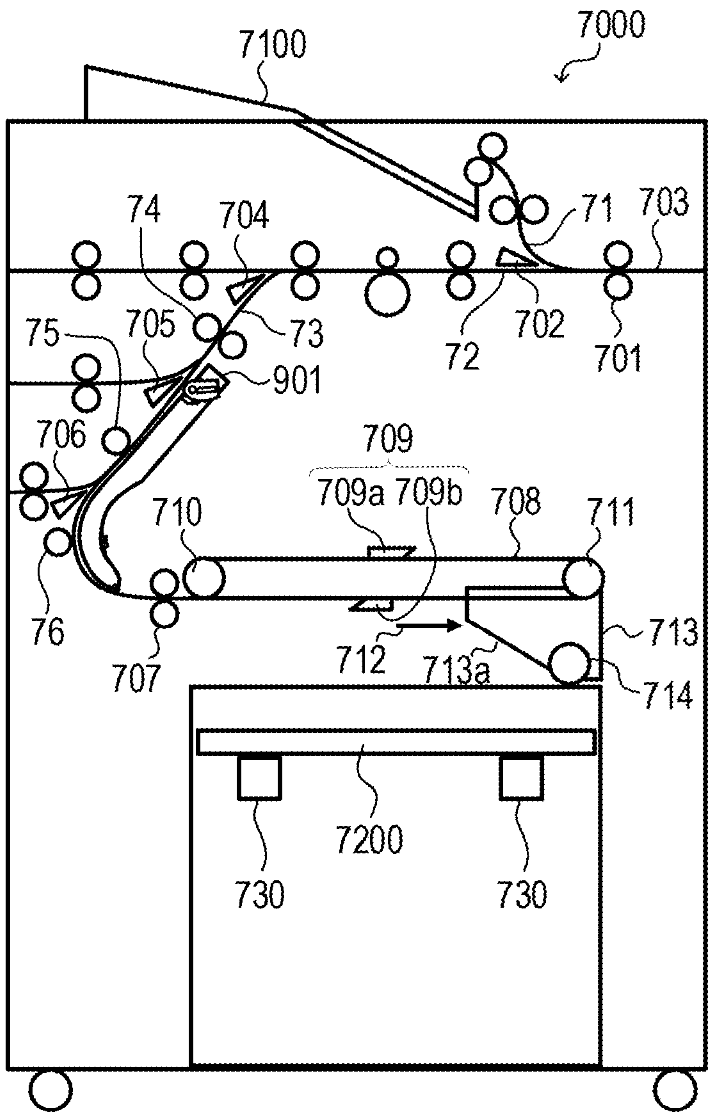
FIG. 2 is a sectional view of a discharge stacking module.

Next, a configuration of a discharge stacking module 7000 serving as a sheet stacking apparatus is described. FIG. 2 is a sectional view of the discharge stacking module 7000. With reference to FIG. 2, a sheet stacking operation of the discharge stacking module 7000 is described. The discharge stacking module 7000 includes an inlet roller 701, a first switching member 702, a conveyance guide 703, a second switching member 704, a third switching member 705, a fourth switching member 706, a discharge roller 707, a gripper belt 708, and a gripper 709. The discharge stacking module 7000 further includes a leading-edge stopper 713, a drawing belt 714, and an openable and closable guide 901.

A sheet discharged from the reversing module 6000 is conveyed to the inlet roller 701 along the conveyance guide 703. The first switching member 702 switches a conveyance path to a first conveyance path 71 and to a second conveyance path 72 in accordance with a selection instruction from a console unit (not shown). In a case in which a user operates the console unit (not shown) to designate a top tray 7100 provided on an upper surface of the discharge stacking module 7000 as a sheet stacking portion, the first switching member 702 switches the conveyance path to the first conveyance path 71 to discharge the sheet to the top tray 7100.

In a case in which the user operates the console unit (not shown) to designate the stack tray 7200 as the sheet stacking portion, the first switching member 702 switches the conveyance path to the second conveyance path 72 to convey the sheet to the second switching member 704. The second switching member 704 switches the conveyance path to a third conveyance path 73. The sheet is conveyed by conveyance rollers 74, 75, and 76 serving as conveyance units, and the third switching member 705 and the fourth switching member 706 switch the conveyance path to convey the sheet to the discharge roller 707. The sheet conveyed by the discharge roller 707 is conveyed while being gripped by any one of a first gripper 709*a* and a second gripper 709*b* (hereinafter referred to as "griper 709") attached to the gripper belt 708. The gripper belt 708 is suspended by a driving pulley 710 and a driven pulley 711 and rotates in association with a drive of a belt motor (not shown) to thereby rotate in a rotation direction 712.

The sheet is conveyed above the stack tray 7200 while being gripped by the gripper 709 and the discharge roller 707. The sheet conveyed as described above is brought into abutment against an abutment slope (abutment portion) 713*a* of the leading-edge stopper 713, to thereby be released from the gripper 709. The sheet is guided to the abutment slope 713*a* of the leading-edge stopper 713 by the drawing belt 714, and thus a position of a leading edge of the sheet is aligned. At the same time, a trailing edge of the sheet moves away from the discharge roller 707, and the sheet is stacked on the stack tray 7200 with the leading edge thereof being positionally regulated. Here, a distance between the drawing belt 714 and the discharge roller 707 is set to be smaller than a length of a sheet to be discharged. At that time, a position of the stack tray 7200 along the height direction is controlled such that the drawing belt 714 comes into contact with an upper surface of a bundle of sheets stacked on the stack tray 7200. After that, a sheet to be next discharged from the discharge roller 707 is conveyed above the stack tray 7200 with a leading edge thereof being gripped by a next gripper 709 and is stacked on the stack tray 7200. Then, in a case in which the stacked sheets are to be taken out after the end of a job or in the course of a job, the stack tray 7200 is lowered to a sheet take-out position on a lower side by a raising and lowering portion 730.

Further, a discharge option (not shown) can be connected downstream of the discharge stacking module 7000. The conveyance path is switched by the second switching member 704, the third switching member 705, or the fourth switching member 706 in accordance with a discharge height of the discharge option, and thus the sheet can be conveyed to the discharge option located downstream of the discharge stacking module 7000.

(Description of Trolley)

Figure 3A:
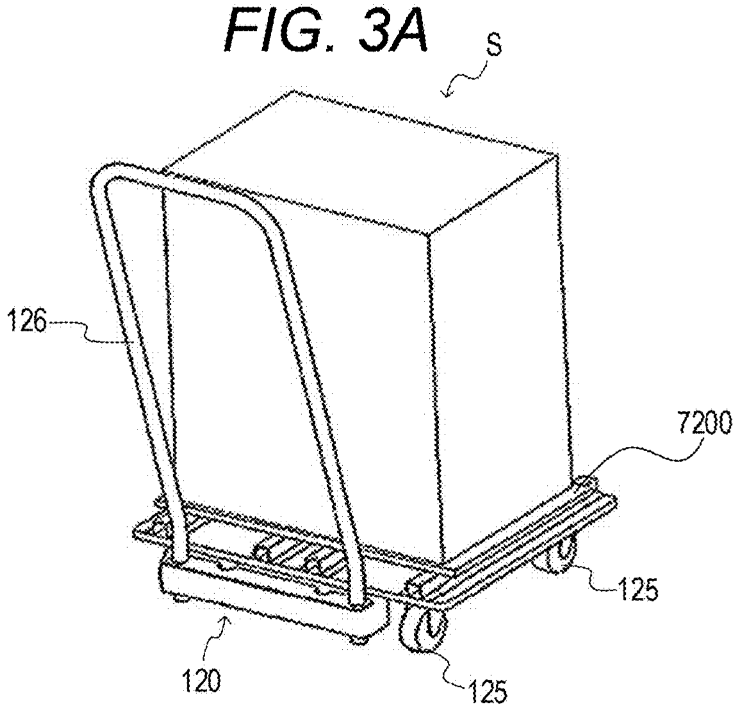
FIG. 3A and FIG. 3B are explanatory views of a trolley.
Figure 3B:
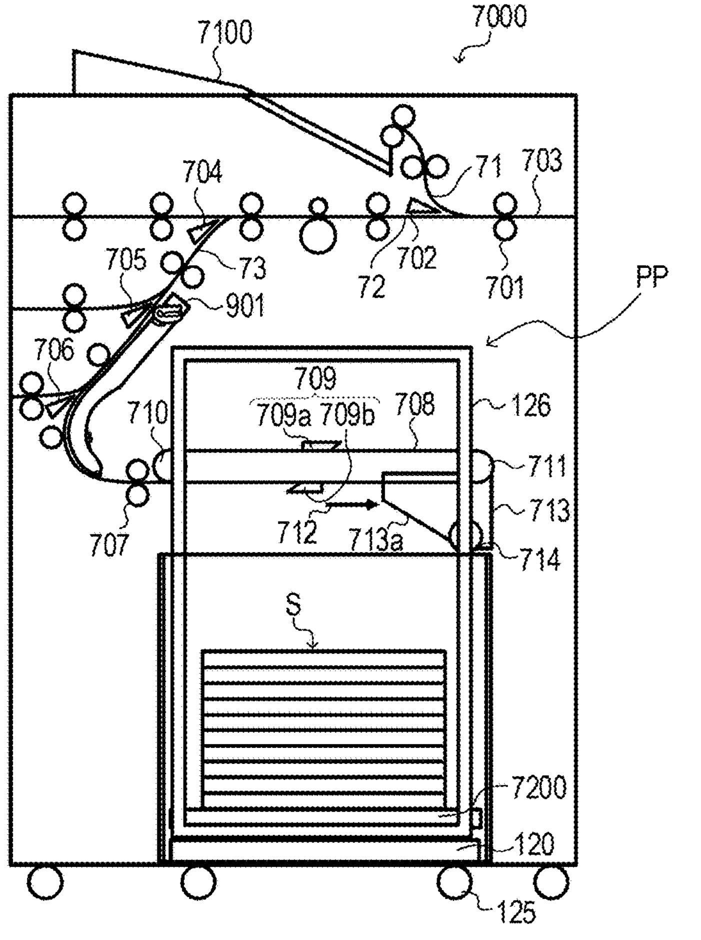

Next, a configuration of a platform trolley (hereinafter referred to as "trolley") 120 is described with reference to FIG. 3A and FIG. 3B. FIG. 3A and FIG. 3B are explanatory views of the trolley 120. FIG. 3A is a perspective view of the trolley 120. FIG. 3B is a sectional view of the discharge stacking module 7000 in which the trolley 120 has been stored. The trolley 120 is stored at a predetermined position PP in the discharge stacking module 7000. A sheet having been conveyed through the sheet conveyance path is discharged by the discharge roller 707 and is stacked on the stack tray 7200. The trolley 120 is used for carrying a sheet bundle S stacked on the stack tray 7200. As illustrated in FIG. 3B, the trolley 120 is provided in the discharge stacking module 7000. The trolley 120 includes four casters 125 in total at four corners, respectively, and an operation portion (handle) 126. The trolley 120 can be separated from the discharge stacking module 7000 by the user operating the operation portion 126 and can be moved to carry the sheet bundle S.

When the sheet bundle S stacked on the stack tray 7200 are to be taken out, the stack tray 7200 is lowered by a motor (not shown). The stack tray 7200 is stopped at a lower-limit position that is lower than a position detected by a full-load position sensor (not shown) by a predetermined distance. In a state in which the stack tray 7200 is stopped at the lower-limit position, a door (not shown) that is provided to the discharge stacking module 7000 and covers the trolley 120 is opened. When the trolley 120 is pulled out of the discharge stacking module 7000, the sheet bundle S together with the lowered stack tray 7200 can be carried out of the discharge stacking module 7000. The door (not shown) is configured to be openable and closeable by hinges (not shown) provided on the discharge stacking module 7000.

(Description of Openable and Closable Guide)

Figure 4A:
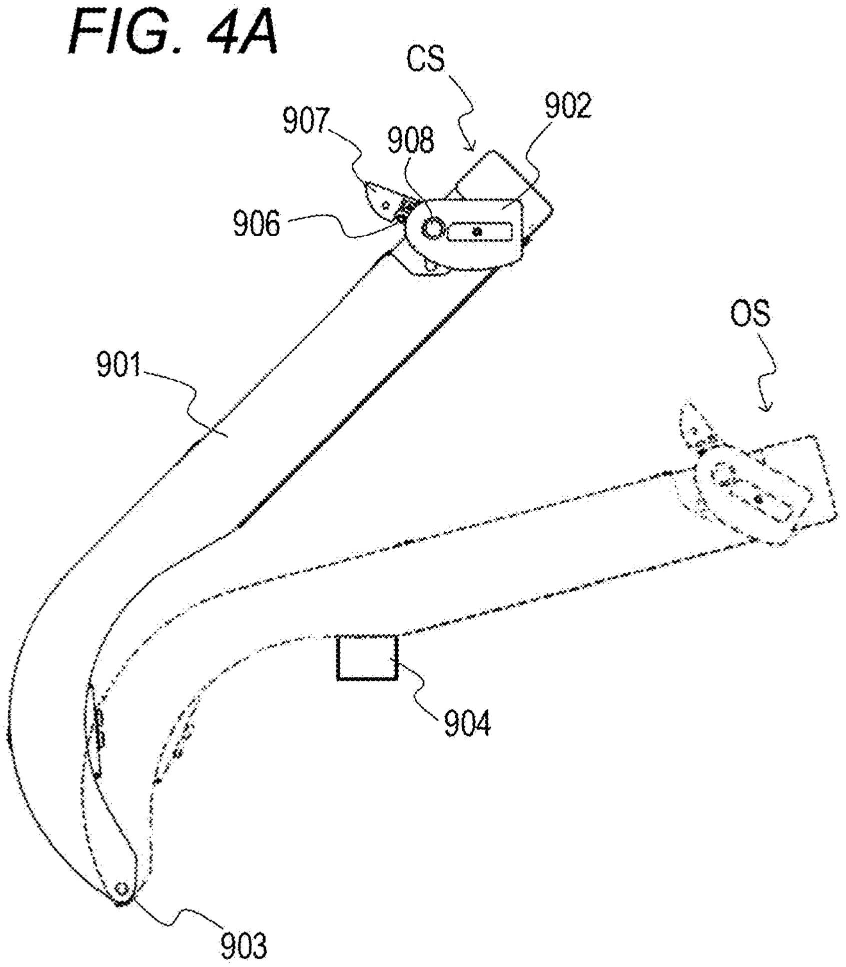
FIG. 4A is an explanatory view of an openable and closable guide.
Figure 4B:
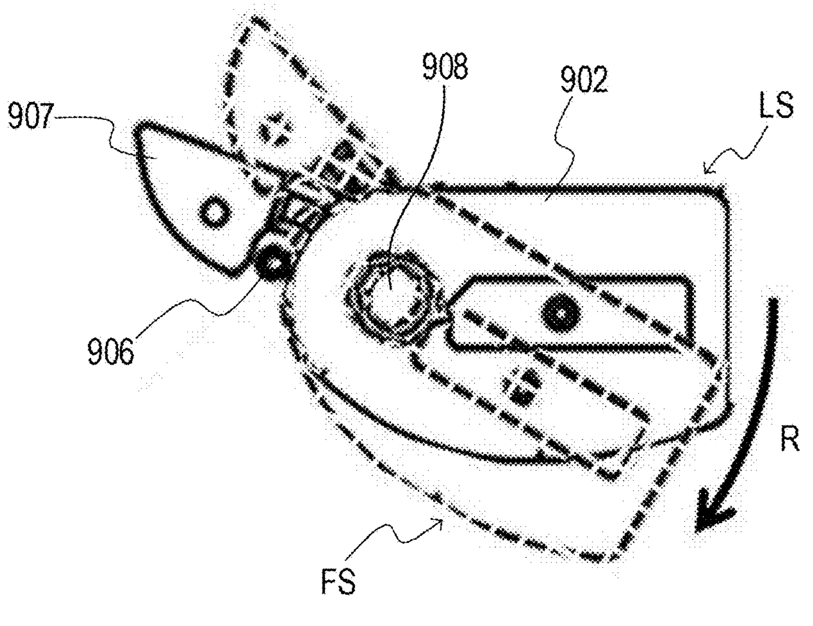
FIG. 4B is an explanatory view of a latch.

Next, a configuration of the openable and closable guide 901 is described with reference to FIG. 4A. FIG. 4A is an explanatory view of the openable and closable guide 901. FIG. 4A is a view for illustrating a closed state CS (closed position indicated by a solid line) in which the openable and closable guide 901 is closed, and an open state OS (open position indicated by a broken line) in which the openable and closable guide 901 is opened. The openable and closable guide 901 forms a part of the third conveyance path 73. That is, the openable and closable guide 901 guides a sheet in the closed state CS illustrated in FIG. 4A. The openable and closable guide 901 can be opened and closed in order to remove a sheet (jammed sheet) stopping on the third conveyance path 73. In a case in which the openable and closable guide 901 is in the open state OS, at least the part of the third conveyance path 73 is opened. The openable and closable guide 901 is provided with a knob (gripper) 902 to be gripped by the user in opening and closing the openable and closable guide 901, and a latch (engaging portion) 907. FIG. 4B is a view for illustrating a fixed state (locked state) LS (solid line) in which the latch 907 is engaged with a fixed portion (engaged portion) 906, and a free state (unlocked state) FS (broken line) in which the latch 907 is away from the fixed portion 906. The latch 907 is a lock member that is rotatably provided on the openable and closable guide 901, is engageable with the fixed portion 906, and is engaged with the fixed portion 906 to lock the openable and closable guide 901 into the closed state CS.

In the embodiment, the openable and closable guide 901 is provided with the knob (gripper) 902, a rotation shaft 903, and the latch 907. The knob 902 is gripped by the user in order for the user to perform an opening and closing operation of the openable and closable guide 901. The rotation shaft 903 supports the openable and closable guide 901 so that the openable and closable guide 901 is rotatable, and functions as a supporting point of an opening and closing operation of the openable and closable guide 901. The rotation shaft 903 may be provided on the discharge stacking module 7000. The openable and closable guide 901 may be rotatable about the rotation shaft 903. The latch 907 maintains the openable and closable guide 901 in the closed state CS when the latch 907 is engaged with the fixed portion 906.

The discharge stacking module 7000 is provided with an opening and closing regulation portion 904 and the fixed portion 906. When the openable and closable guide 901 is opened, the opening and closing regulation portion 904 is brought into abutment against the openable and closable guide 901 and regulates an opening operation of the openable and closable guide 901 so that the openable and closable guide 901 is prevented from being opened at a predetermined angle or more. The fixed portion 906 is fixed to the discharge stacking module 7000 so that the latch 907 is engaged with the fixed portion 906 to maintain the openable and closable guide 901 in the closed state CS.

The latch 907 and the knob 902 are connected to a rotation shaft 908 provided on the openable and closable guide 901. The latch 907 and the knob 902 are configured to rotate about the rotation shaft 908 integrally with each other. When the user rotates the knob 902 in a rotation direction R, the latch 907 rotates about the rotation shaft 908 integrally with the knob 902. The knob 902 is always subjected to a moment (is urged) in a direction opposite to the rotation direction R by an urging force of a torsional coil spring (not shown) serving as an urging member.

When the user operates the knob 902 to engage the latch 907 with the fixed portion 906, the openable and closable guide 901 is maintained in the closed state CS. At this time, the latch 907 is maintained in the locked state LS. When the user rotates the knob 902 in the rotation direction R, the engagement of the latch 907 with the fixed portion 906 is released, and hence the closed state CS is released. Thus, the state of the latch 907 is moved from the fixed state LS to the free state FS. The configuration for maintaining the openable and closable guide 901 in the closed state CS is not limited to the engagement of the latch 907 with the fixed portion 906 and may be another configuration.

To remove a jammed sheet stopping on the third conveyance path 73, the user rotates the knob 902 of the openable and closable guide 901 in the rotation direction R, to thereby disengage the latch 907 from the fixed portion 906 and place the openable and closable guide 901 in the free state FS. With the openable and closable guide 901 being in the free state FS, the user can open the openable and closable guide 901. The user opens the openable and closable guide 901 until the openable and closable guide 901 abuts against the opening and closing regulation portion 904 at maximum, and thus can remove the jammed sheet.

(Description of Position of Operation Portion of Trolley)

Figure 5A:
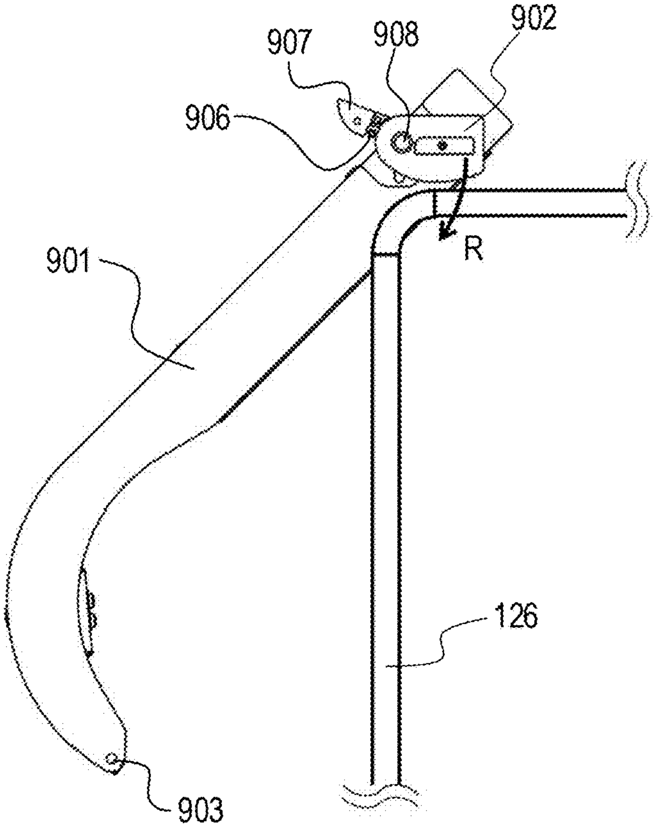
FIG. 5A and FIG. 5B are explanatory views of a positional relationship between an operation portion and a knob.
Figure 5B:
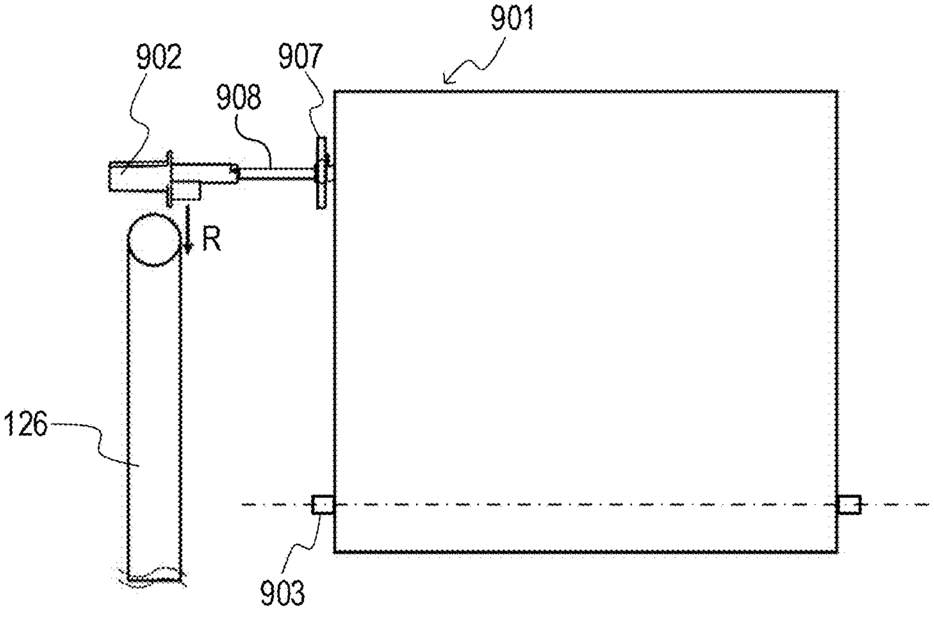

Next, a positional relationship between the operation portion 126 of the trolley 120 and the knob 902 of the openable and closable guide 901 is described. FIG. 5A and FIG. 5B are explanatory views of the positional relationship between the operation portion 126 and the knob 902. FIG. 5A is a front view for illustrating the positional relationship between the operation portion 126 of the trolley 120 and the knob 902 of the openable and closable guide 901. FIG. 5B is a right-side view for illustrating the positional relationship between the operation portion 126 of the trolley 120 and the knob 902 of the openable and closable guide 901.

In the first embodiment, when the trolley 120 is stored in the discharge stacking module 7000, the operation portion 126 is placed at a position at which the knob 902 is prevented from rotating in the rotation direction R so that the openable and closable guide 901 cannot be opened (FIG. 5A and FIG. 5B). Thus, it is impossible to perform a jam clearing process without moving the trolley 120 to the outside of the discharge stacking module 7000 before rotating the knob 902 in the rotation direction R in order to open the openable and closable guide 901 for the jam clearing process. In other words, a series of operations in which the openable and closable guide 901 is unlocked and moved from the closed position to the open position are regulated by the trolley. Meanwhile, separating the trolley 120 from the discharge stacking module 7000 allows the knob 902 of the openable and closable guide 901 to rotate in the rotation direction R, and thus the fixed state LS of the latch 907 becomes releasable. The user can rotate the knob 902 in the rotation direction R and open the openable and closable guide 901 to perform the jam clearing process.

According to the first embodiment, the rotation of the knob 902 is regulated by the operation portion 126 of the trolley 120, and hence, the user can easily understand that the trolley 120 is required to be carried out of the discharge stacking module 7000 in order to make the knob 902 rotatable. Therefore, according to the first embodiment, the user can carry the trolley 120 out of the discharge stacking module 7000 before performing the jam clearing process. This allows the user to perform the jam clearing process without collapsing sheets aligned and stacked on the trolley 120.

Rotation of the knob 902 in the rotation direction R may be regulated by not only the operation portion 126 of the trolley 120, but also any other portion in the trolley 120. A regulation portion that regulates the movement of the knob 902 may be provided on the trolley 120. The regulation portion that regulates movement of the knob 902 may be, for example, an edge regulation portion provided on the trolley 120 for regulating an edge of a sheet. The regulation portion that regulates the movement of the knob 902 may be a part of the trolley 120. According to the first embodiment, sheets stacked on the trolley 120 in the discharge stacking module 7000 serving as the sheet stacking apparatus are prevented from being shifted by the jam clearing process, which enables improvement of the ability to align sheets. According to the first embodiment, the user can be prevented from accidentally touching sheets on the trolley 120 during the jam clearing process, without an increase in size of the discharge stacking module 7000.

Further, in the embodiment, the operation portion 126 of the trolley 120 and the knob 902 are placed close to each other. In general, downsizing the sheet stacking apparatus results in further limitation to positions suitable for operation by the user, but, in the embodiment, both the operation portion 126 and the knob 902 can be placed at positions suitable for operation by the user. That is, in the embodiment, both downsizing of the sheet stacking apparatus and high user operability can be achieved.

Second Embodiment

Figure 6A:
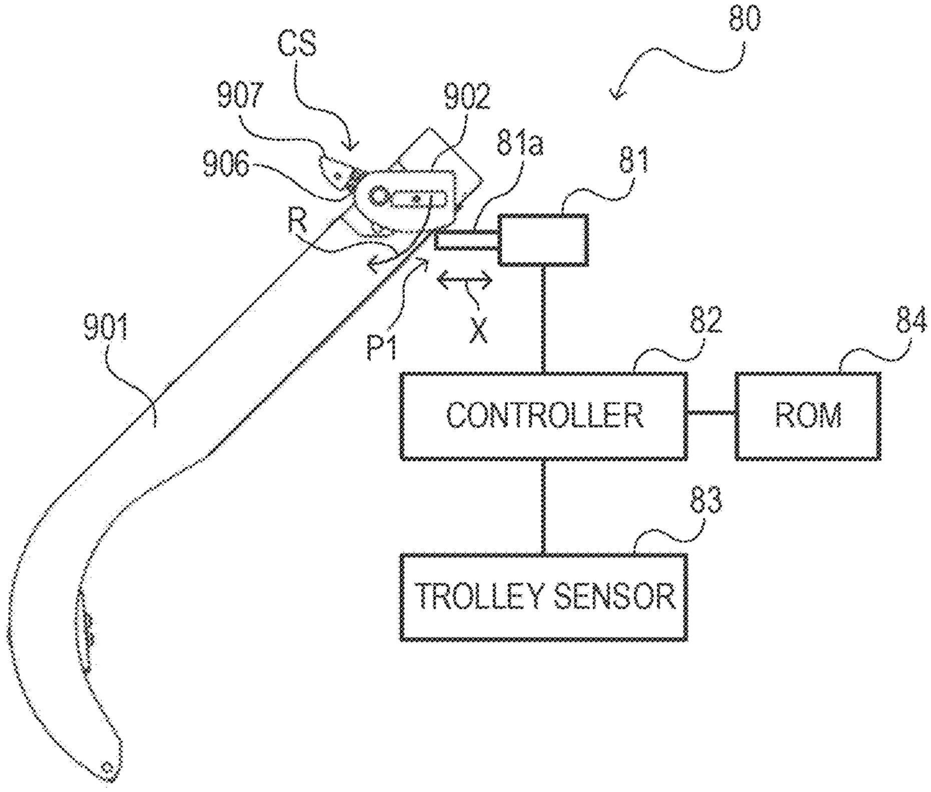
FIG. 6A and FIG. 6B are block diagrams of a lock control system for the openable and closable guide in a second embodiment.
Figure 6B:
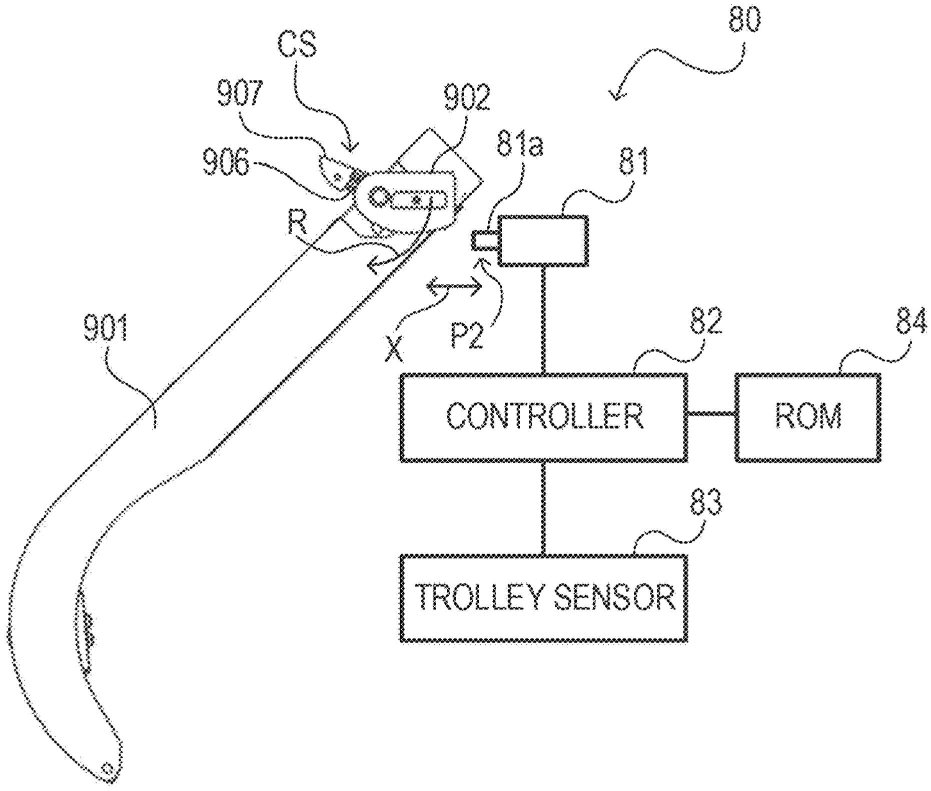

Now, with reference to FIG. 6A and FIG. 6B, a second embodiment is described. As the image forming apparatus 1 of the second embodiment is the same as in the first embodiment, a description thereof is omitted. In the first embodiment, the configuration has been described in which the operation portion 126 of the trolley 120 prevents the knob 902 of the openable and closable guide 901 from rotating in the rotation direction R, to prohibit the jam clearing process while the trolley 120 is stored in the discharge stacking module 7000, but the present disclosure is not limited thereto. The discharge stacking module 7000 of the second embodiment is different from the first embodiment in including a lock control system 80. The differences are mainly described below.

FIG. 6A and FIG. 6B are block diagrams of the lock control system 80 for the openable and closable guide 901 in the second embodiment. The lock control system 80 includes a solenoid 81, a controller 82, a trolley sensor 83, and a read only memory (ROM) 84. The solenoid 81 is a lock mechanism that locks the openable and closable guide 901 into the closed state CS. The trolley sensor 83 detects whether or not the trolley 120 has been carried out of the discharge stacking module 7000. The controller 82 is electrically connected to the solenoid 81, the trolley sensor 83, and the ROM 84. The controller 82 drives the solenoid 81 in accordance with a detection result of the trolley sensor 83. The ROM 84 is a storage portion in which a control program executed by the controller 82 is stored.

The solenoid 81 is fixed to the discharge stacking module 7000. The solenoid 81 includes a plunger 81*a* that is movable to a prohibiting position (first position) P1 (FIG. 6A) and to a release position (second position) P2 (FIG. 6B) along a predetermined direction X. FIG. 6A is a view for illustrating a state in which the plunger 81*a* is in the prohibiting position P1. As illustrated in FIG. 6A, when the plunger 81*a* is in the prohibiting position, the plunger 81*a* protrudes along the direction X to abut against the knob 902.

Even when the user tries to rotate the knob 902 in the rotation direction R, the plunger 81*a* is brought into abutment against the knob 902, to prohibit the knob 902 from rotating in the rotation direction R. The user cannot rotate the knob 902 in the rotation direction R, and thus cannot open the openable and closable guide 901, so that the openable and closable guide 901 is maintained in the closed state CS.

FIG. 6B is a view for illustrating a state in which the plunger 81*a* is in the release position P2. As illustrated in FIG. 6B, when the plunger 81*a* is in the release position P2, the plunger 81*a* retracts along the direction X, to permit the knob 902 to rotate in the rotation direction R. When the plunger 81*a* is in the release position P2, the user can rotate the knob 902 in the rotation direction R and open the openable and closable guide 901.

Figure 7:
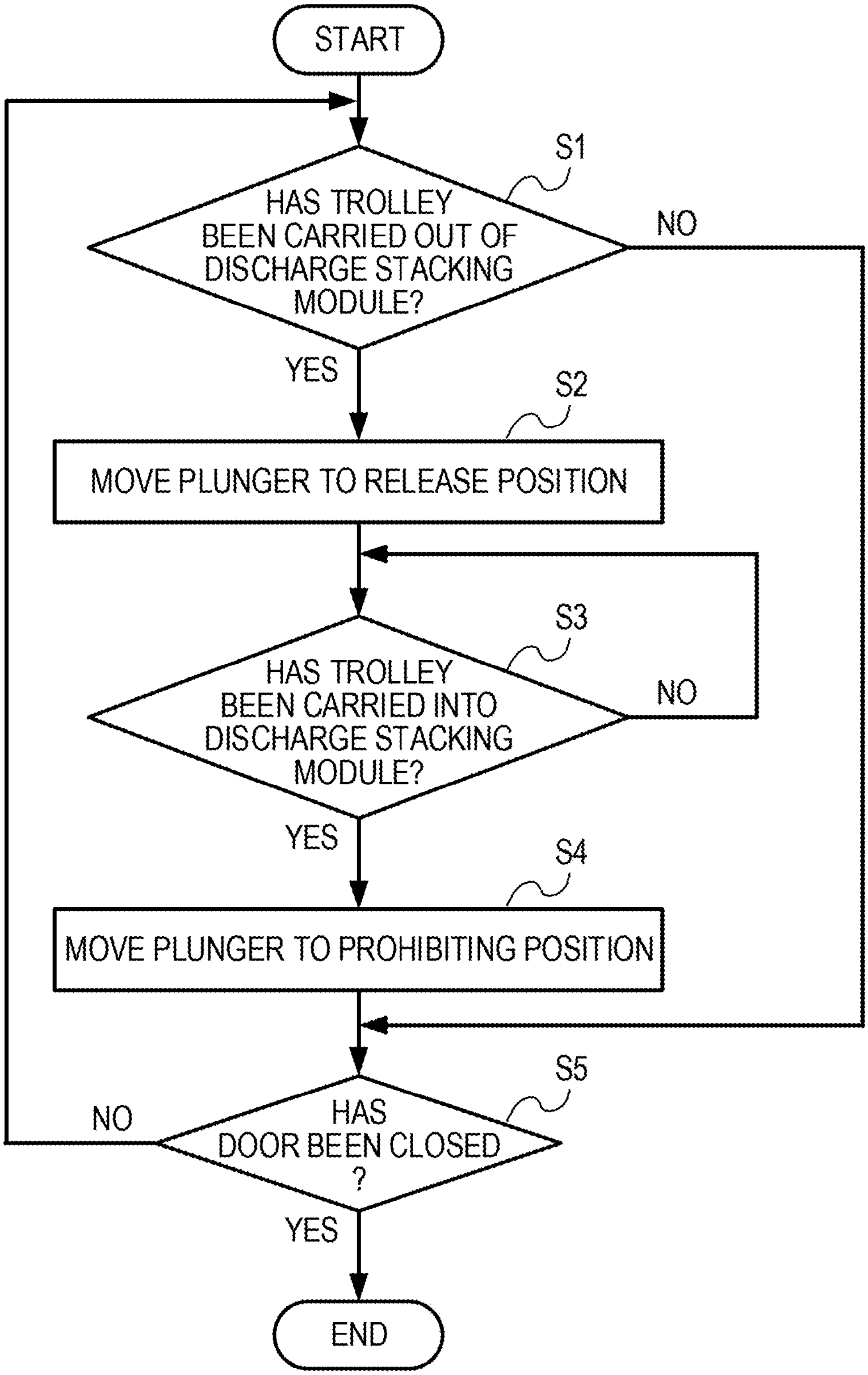
FIG. 7 is a flowchart for illustrating an unlock control operation performed by a controller.

FIG. 7 is a flowchart for illustrating an unlock control operation performed by the controller 82. The controller 82 includes a central processing unit (CPU). The controller 82 performs the unlock control operation in accordance with the control program stored in the ROM 84. The controller 82 starts the unlock control operation when the door (not shown) of the discharge stacking module 7000 is opened. The controller 82 determines whether or not the trolley 120 has been carried out of the discharge stacking module 7000 in accordance with a detection signal from the trolley sensor 83 (Step S1). In a case in which the trolley 120 is stored in the discharge stacking module 7000 (No in Step S1), the controller 82 proceeds with the process to Step S5 while maintaining the plunger 81*a* in the prohibiting position P1. The controller 82 determines whether or not the door (not shown) has been closed (Step S5) and returns the process to Step S1 in a case in which the door (not shown) is held open (NO in Step S5). In a case in which the trolley 120 has been carried out of the discharge stacking module 7000 (YES in Step S1), the controller 82 controls the solenoid 81 to retract the plunger 81*a* of the solenoid 81 and move the plunger 81*a* to the release position P2. The trolley 120 has been carried out of the discharge stacking module 7000, and the plunger 81*a* is in the release position P2, which allows the user to rotate the knob 902 in the rotation direction R and open the openable and closable guide 901. The user can remove a sheet stopping on the third conveyance path 73.

The controller 82 determines whether or not the trolley 120 has been stored in the discharge stacking module 7000 in accordance with a detection signal from the trolley sensor 83 (Step S3). In a case in which the trolley 120 has not been stored in the discharge stacking module 7000 (No in Step S3), the controller 82 repeats the step S3 while maintaining the plunger 81*a* in the release position P2. In a case in which the trolley 120 has been stored in the discharge stacking module 7000 (YES in Step S3), the controller 82 controls the solenoid 81 to protrude the plunger 81*a* of the solenoid 81 and move the plunger 81*a* to the prohibiting position P1 (Step S4). The trolley 120 is stored in the discharge stacking module 7000, and thus the plunger 81*a* in the prohibiting position P1 prohibits the user from rotating the knob 902 in the rotation direction R, to prevent the openable and closable guide 901 from being opened.

The controller 82 determines whether or not the door (not shown) has been closed in accordance with a detection signal from a door sensor (not shown) (Step S5). In a case in which the door (not shown) has not been closed (NO in Step S5), the controller 82 returns the process to Step S1. In a case in which the door (not shown) has been closed (YES in Step S5), the controller 82 ends the unlock control operation.

In the second embodiment, a platform trolley (flat trolley) not provided with the operation portion 126 may be used instead of the trolley 120 provided with the operation portion (handle) 126. According to the second embodiment, the user can be prevented from accidentally touching sheets on the trolley 120 during the jam clearing process, without an increase in size of the discharge stacking module 7000.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-172586, filed Oct. 4, 2023, which is hereby incorporated by reference herein in its entirety.

What is claimed is:

1. A sheet stacking apparatus comprising:
- a conveyance path through which a sheet is to be conveyed;
- a guide which forms a part of the conveyance path and is openable and closeable with respect to the conveyance path;
- a lock member configured to lock the guide to maintain the guide in a closed state in which the guide is closed with respect to the conveyance path; and
- a trolley,
- wherein, in a case in which the trolley is placed at a predetermined position in the sheet stacking apparatus, a locked state in which the lock member locks the guide is prohibited from being unlocked so that the guide is maintained in the closed state, and
- wherein, in a case in which the trolley is not placed at the predetermined position, the locked state is allowed to become an unlocked state in which the lock member does not lock the guide.

2. The sheet stacking apparatus according to claim 1, wherein:
- the trolley is provided with an operation portion used for operating the trolley, and
- in the case in which the trolley is placed at the predetermined position, the operation portion regulates a movement of the lock member to prohibit the locked state from being unlocked.

3. The sheet stacking apparatus according to claim 1, further comprising:
- a sensor configured to detect that the trolley is placed at the predetermined position; and
- a control system configured to regulate a movement of the lock member to prohibit the locked state from being unlocked in a case in which the control system determines that the trolley is placed at the predetermined position in accordance with a detection result of the sensor.

4. The sheet stacking apparatus according to claim 1, wherein the lock member assumes the locked state in which the lock member locks the guide so that the guide is maintained in the closed state and the unlocked state in which the lock member allows the guide to move from the closed state to an open state.

5. The sheet stacking apparatus according to claim 4, wherein, in a case in which the lock member assumes the unlocked state, the guide is allowed to be opened so that the conveyance path is opened.

6. The sheet stacking apparatus according to claim 1, further comprising:

an engaged portion with which the lock member is engageable, wherein the lock member is rotatably provided on the guide, and wherein the lock member engages with the engaged portion so that the guide is maintained in the closed state in which the guide is closed with respect to the conveyance path.

7. The sheet stacking apparatus according to claim 4, further comprising:

a gripper configured to be gripped by a user in opening and closing the guide, wherein the gripper is rotatable integrally with the lock member.

8. The sheet stacking apparatus according to claim 7, wherein, in the case in which the trolley is not placed at the predetermined position, the gripper is allowed to be rotated to switch a state of the lock member between the locked state and the unlocked state.

9. The sheet stacking apparatus according to claim 8, wherein, in the case in which the trolley is placed at the predetermined position, a part of the trolley is allowed to abut against the gripper to prohibit the lock member from assuming the unlocked state.

10. The sheet stacking apparatus according to claim 9, wherein the part of the trolley is an operation portion used for operating the trolley.

11. The sheet stacking apparatus according to claim 2, wherein, in the case in which the trolley is not placed at the predetermined position, the lock member is allowed to assume the unlocked state in which a state of the guide is allowed to be switched from the closed state to an open state.

12. The sheet stacking apparatus according to claim 3, wherein, in a case in which the control system determines that the trolley is not placed at the predetermined position in accordance with the detection result of the sensor, the control system allows the movement of the lock member so that the locked state is allowed to be unlocked.

13. The sheet stacking apparatus according to claim 3, wherein:

a gripper configured to be gripped by a user in opening and closing the guide is provided on the guide so as to be rotatable integrally with the lock member, the control system includes a solenoid including a plunger configured to be abuttable against the gripper, in the case in which the control system determines that the trolley is placed at the predetermined position in accordance with the detection result of the sensor, the control system controls the solenoid to bring the plunger into abutment against the griper to regulate the movement of the lock member to prohibit the locked state from being unlocked, and in a case in which the control system determines that the trolley is not placed at the predetermined position in accordance with the detection result of the sensor, the control system controls the solenoid to move the plunger away from the gripper to allow the movement of the lock member so that the locked state is allowed to be unlocked.

14. The sheet stacking apparatus according to claim 1, further comprising a rotation shaft configured to support the guide rotatably.

15. The sheet stacking apparatus according to claim 1, further comprising a regulation portion configured to regulate an opening operation of the guide.

16. The sheet stacking apparatus according to claim 6, wherein:

the lock member is a latch, and the engaged portion is a fixed portion.

17. The sheet stacking apparatus according to claim 1, further comprising:

a stack tray on which the sheet conveyed through the conveyance path is stacked; and a raising and lowering portion configured to raise and lower the stack tray, wherein the stack tray is loaded on the trolley by the raising and lowering portion.

18. The sheet stacking apparatus according to claim 1, wherein the trolley is placed below the guide.

19. A sheet stacking apparatus comprising:

a conveyance path through which a sheet is to be conveyed;

a guide which forms a part of the conveyance path and is movable to a closed position in which the guide guides the sheet and to an open position in which the guide opens the conveyance path;

a member configured to move the guide between the open position and the closed position; and a trolley which is movable away from the guide, wherein the trolley is configured such that part of the trolley positioned at a predetermined position physically interferes with the member to regulate an operation of moving the guide from the closed position to the open position, and wherein, in a case in which the trolley has been moved from the predetermined position in a direction away from the guide, the guide is allowed to move from the closed position to the open position.

20. An image forming apparatus comprising:

an image forming portion configured to form an image on a sheet; and a sheet stacking apparatus on which the sheet on which the image is formed by the image forming portion is stacked, the sheet stacking apparatus including:

a conveyance path through which the sheet is to be conveyed;

a guide which forms a part of the conveyance path and is openable and closeable with respect to the conveyance path;

a lock member configured to lock the guide to maintain the guide in a closed state in which the guide is closed with respect to the conveyance path; and a trolley, wherein, in a case in which the trolley is placed at a predetermined position in the sheet stacking apparatus, a locked state in which the lock member locks the guide is prohibited from being unlocked so that the guide is maintained in the closed state, and wherein, in a case in which the trolley is not placed at the predetermined position, the locked state is allowed to become an unlocked state in which the lock member does not lock the guide.

21. The sheet stacking apparatus according to claim 19, further comprising:

a stack tray on which the sheet conveyed through the conveyance path is stacked; and a raising and lowering portion configured to raise and lower the stack tray, wherein the stack tray is loaded on the trolley by the raising and lowering portion.

* * * * *